US010889464B2

(12) United States Patent
Mattsson et al.

(10) Patent No.: US 10,889,464 B2
(45) Date of Patent: Jan. 12, 2021

(54) SYSTEM FOR THE GENERATION OF CALL ADVANCE DATA

(71) Applicant: KONE Corporation, Helsinki (FI)

(72) Inventors: Veikko Mattsson, Helsinki (FI); Kenneth Kronkvist, Helsinki (FI)

(73) Assignee: KONE CORPORATION, Helsinki (FI)

( * ) Notice: Subject to any disclaimer, the term of this patent is extended or adjusted under 35 U.S.C. 154(b) by 728 days.

(21) Appl. No.: 15/603,110

(22) Filed: May 23, 2017

(65) Prior Publication Data

US 2017/0253463 A1 Sep. 7, 2017

Related U.S. Application Data

(63) Continuation of application No. PCT/EP2014/078477, filed on Dec. 18, 2014.

(51) Int. Cl.
*B66B 1/34* (2006.01)
*B66B 5/00* (2006.01)
(Continued)

(52) U.S. Cl.
CPC .......... *B66B 5/0018* (2013.01); *B66B 1/3446* (2013.01); *B66B 1/3492* (2013.01);
(Continued)

(58) Field of Classification Search
USPC .......................................................... 187/250
See application file for complete search history.

(56) References Cited

U.S. PATENT DOCUMENTS 3,972,389 A * 8/1976 Faup .......................... B66B 1/36 187/293
7,434,666 B2 * 10/2008 Tyni .......................... B66B 1/40 187/293
(Continued)

FOREIGN PATENT DOCUMENTS

WO WO 2014/000792 A1 1/2014

OTHER PUBLICATIONS

International Search Report, issued in PCT/EP2014/078477 (PCT/ISA/210), dated Aug. 26, 2015.
(Continued)

*Primary Examiner* — Christopher Uhlir
(74) *Attorney, Agent, or Firm* — Birch, Stewart, Kolasch & Birch, LLP

(57) ABSTRACT

A system for the generation of call advance data for an elevator control, which system is going to be installed in an elevator car moving in an elevator shaft and includes at least one acceleration sensor outputting current acceleration data and/or magnetometer outputting a magnetic flux signal which includes current magnetic flux data at the current position of the elevator car, which acceleration sensor and/or magnetometer is mounted in connection with the elevator car; a velocity calculating unit which calculates from the current acceleration/magnetic flux data current car velocity data; a position calculating unit which calculates from the current acceleration/magnetic flux data and/or from the current car velocity data current car position data; and a call advance processing unit which calculates from the current car velocity data and the current car position data call advance data which designates the time until which the car is able to stop at the next approaching floor in travelling direction, which call advance data is transmitted to a call allocation unit of an elevator control. Call advance data is provided in an easy manner without using existing car
(Continued)

Figure 1:
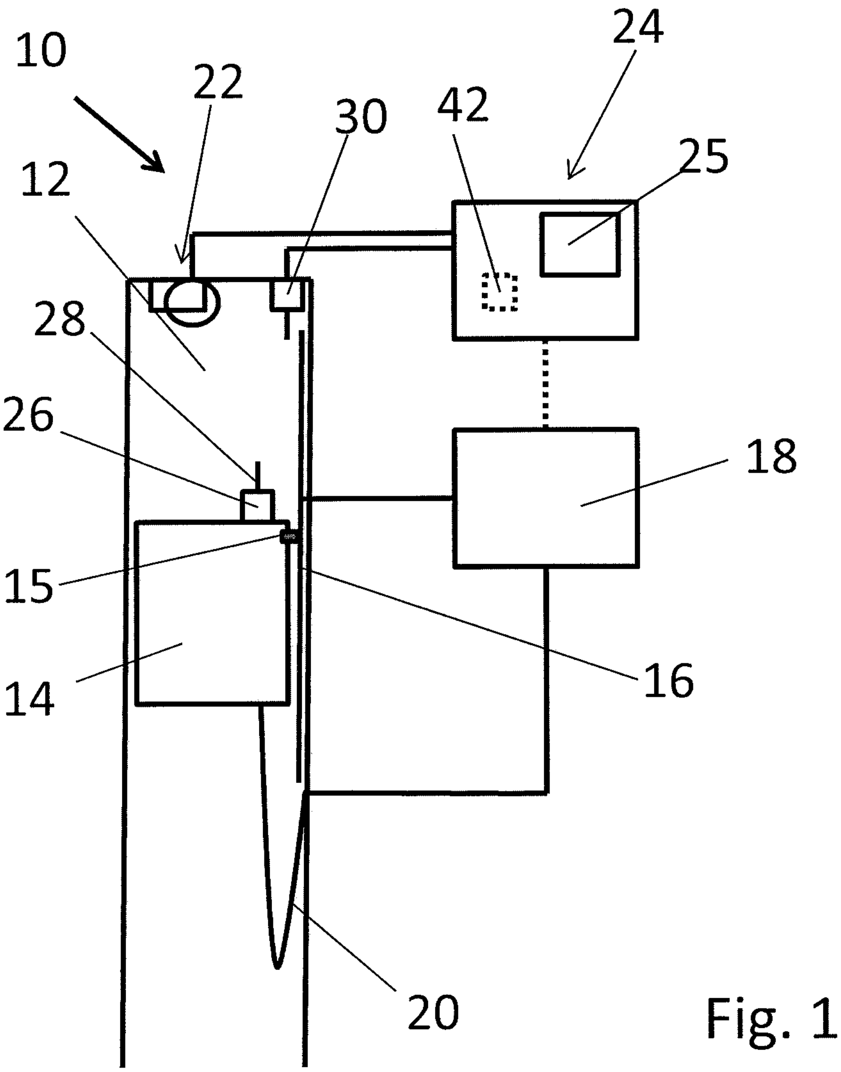

position detection devices of an existing elevator to be modernized.

16 Claims, 2 Drawing Sheets

(51) Int. Cl.

| | |
|---|---|
| ***B66B 19/00*** | (2006.01) |
| ***B66B 9/00*** | (2006.01) |
| ***G01C 21/16*** | (2006.01) |
| *B66B 1/28* | (2006.01) |

(52) U.S. Cl.
CPC .......... *B66B 5/0025* (2013.01); *B66B 5/0037* (2013.01); *B66B 9/00* (2013.01); *B66B 19/007* (2013.01); *G01C 21/16* (2013.01); *B66B 1/285* (2013.01)

(56) References Cited

U.S. PATENT DOCUMENTS

| | | | | |
|---|---|---|---|---|
| 7,562,747 | B2 * | 7/2009 | Marchesi | B66B 1/3492 187/391 |
| 2003/0116384 | A1 * | 6/2003 | Friedli | B66B 19/007 187/380 |
| 2008/0135346 | A1 | 6/2008 | Kattainen et al. | |
| 2012/0181118 | A1 * | 7/2012 | Choi | B66B 3/02 187/393 |
| 2014/0058700 | A1 * | 2/2014 | Gehrke | B66B 5/0037 702/141 |
| 2014/0174861 | A1 | 6/2014 | Sarjanen et al. | |
| 2014/0312884 | A1 | 10/2014 | Reilio et al. | |

OTHER PUBLICATIONS

Written Opinion of the International Searching Authority, issued in PCT/EP2014/078477 (PCT/ISA/237), dated Aug. 26, 2015.

* cited by examiner

SYSTEM FOR THE GENERATION OF CALL ADVANCE DATA

CROSS REFERENCE TO RELATED APPLICATIONS

This application is a Continuation of PCT International Application No. PCT/EP2014/078477, filed on Dec. 18, 2014, which is hereby expressly incorporated by reference into the present application.

The present invention refers to a system for the generation of call advance data for an elevator control. Currently, an elevator car moving in an elevator shaft as well as a shaft wall are provided with a co-acting position detection system which informs the elevator control about the current position as well as about the current velocity of the elevator car in the shaft. This data is used by the elevator control, particularly in a call allocation unit of the elevator control, to provide call advance data which informs the call allocation unit up to which point (time) the moving elevator car is able to stop at the next approaching floor in travel direction of the elevator car. A problem comes up during a modernization of an elevator or an elevator group, particularly in course of an overlay modernization where a new elevator control is connected to an existing elevator system to replace the old elevator control and which optionally works simultaneously during a transition period with the old elevator control. The problem of the old position detection system which was connected with the old elevator control is the fact that it regularly does not meet nowadays communication standards. As elevators have a lifetime of more than 30 years, it may be that the old position detection system is a pure mechanical or analogue system which does not allow digital signal output. Sometimes the old position detecting systems are even worn down or are not working according to nowadays standards. Accordingly, there exists a need for retrieving call advance data for the new elevator control.

The present invention satisfies this need with a system according to claim 1 as well as with a method according to claim 14. Preferred embodiments of the invention are subject-matter of the corresponding dependent claims. Inventive embodiments are also presented in the description part of the present application. The inventive content may also consist of several separate inventions, especially if the invention is considered in the light of explicit or implicit subtasks or with respect to advantages or set of advantages achieved. In this case, some of the attributes contained in the claims below may be superfluous from the point of view of separate inventive concepts.

According to the invention, an acceleration sensor and/or a magnetometer are mounted in connection with the elevator car. The acceleration sensor provides an output signal with current acceleration data of the elevator car and the magnetometer provides information about the magnetic flux at the current position of the elevator car in the shaft. Whereas the current acceleration data provided by the acceleration sensor has to be calculated into car position data and car velocity data the magnetic flux data of the magnetometer already provides position data of the elevator car in the elevator shaft as the magnetic flux in the elevator shaft is unique at each position of the elevator car in the shaft. Accordingly, the current magnetic flux data outputted by the magnetometer are indicative of the current position of the elevator car in the elevator shaft when compared with a magnetic flux profile which has been established via initial test runs of the elevator car. Accordingly, via comparison of the current magnetic flux data with the magnetic flux profile the position data and velocity data of the elevator car can easily be calculated. Important is that either of both sensors, the acceleration sensor as well as the magnetometer, are able to provide sufficient data for a call advance processing unit to get information about the current car position and velocity to be able to calculate the required call advance data for the call allocation unit of the elevator control.

The present invention comprises a velocity calculating unit which calculates from the current acceleration data or from the current magnetic flux data current car velocity data. The invention further uses a position calculating unit which calculates from the current acceleration data or magnetic flux data and/or from the current car velocity data current car position data. These two calculating units can be integrated in one calculating unit or be embodied as separate units. As mentioned above, the system for the generation of call advance data comprises a call advance processing unit which calculates from the current car velocity data and the current car position data call advance data which designates the time until which the car is able to stop at the next approaching floor in travelling direction. This call advance processing unit can either be located together with the sensor components and calculating units e.g. in a sensor unit mounted at the elevator car or it can be provided in connection with a call allocation unit of an elevator control. With the call advance data, the call allocation unit is able to decide whether an issued car or floor call can still be served by the elevator car, i.e. whether the elevator car is able to be stopped at the next approaching floor to serve said call.

The invention provides the essential advantage that with the mounting of a simple sensor unit at the elevator car, a new elevator control which is to be connected to an existing elevator system e.g. in course of an overlay modernization is able to get the necessary call advance data to perform call allocation in a sophisticated way. Thereby it is independent of the old car position detection system, which is not necessary any longer unless it is still needed for the old elevator control e.g. over a transition period. Of course, the invention could also be used for the modernization only of the sensor components and could therefore be used in connection with an existing elevator control which is not going to be modernized. The inventive system for the generation of call advance data uses sensors and calculating units which are able to provide car position data as well as current car velocity data in a digital format which is able to be processed by modern elevator controls. A further advantage of the present invention is that the mounting of a sensor unit comprising the acceleration sensor and/or magnetometer together with corresponding processing units does not require extensive wiring as this sensor unit is able to communicate wirelessly with a transmitter connected to the new elevator control. Therefore, in a preferred embodiment of the invention, the inventive system comprises a first wireless data transmission link which is connected with the velocity calculating unit and/or position calculating unit and/or with the call advance processing, which components are connected to the acceleration sensor and/or magnetometer, e.g. in a sensor unit. The first wireless transmission link co-acts with a second wireless transmission link which is connected with the new elevator control. The first wireless data transmission link could for example be a broadcast transmitter with a medium range for example up to 50 m which is preferably located at the outside of the elevator car. The second wireless transmission link is preferably provided in the elevator shaft so that there is direct an obstructed path in the elevator shaft between the first and second wireless transmission link.

Preferably, the acceleration sensor and/or magnetometer as well as the velocity calculating unit and position calculating unit are provided in a sensor unit which is mounted to the elevator car. The sensor unit preferably comprises a housing for the sensor(s) and the calculating unit(s) and optionally the call advance processing unit. Via the housing of the sensor and the corresponding calculating units, a protected arrangement is provided which on one hand protects the components against dirt and environmental influence in the elevator shaft and which on the other hand can easily be mounted to an existing elevator car without complicated wiring of single components. The call advance processing unit may preferably be located in the sensor unit but can also be located in connection with the call allocation unit of the new elevator control. Via the sensor unit which optionally also has a camera scanning the car interior or the car door region following data can be retrieved: door status data, car load data, car position data, car velocity data, number of persons in the car, car acceleration data, maintenance data, wear data, car lighting data. All these data can be obtained without any wiring, if the sensor unit has its own power supply.

The integrated arrangement of the velocity calculating unit and position calculating unit in connection with the acceleration sensor and/or magnetometer has the advantage that the sensor unit provides a position and velocity signal which has up to now been provided by the old position and velocity detection system of the old elevator system. This holds particularly true if also the call advance processing unit is integrated with these components in the sensor unit. Therefore, the sensor unit provides in an easy way call advance data for the call allocation of an elevator control according to nowadays standards.

The first and second wireless transmission link are preferably embodied as bidirectional transmission links so that the acceleration sensor and/or magnetometer can be initiated by the new elevator control to establish an acceleration profile or magnetic profile of the elevator car in the elevator shaft. The elevator control thereby controls the elevator car travel as well as the recording status of the sensor(s). With the establishment of these profiles, the system is able to verify the current acceleration or magnetic flux data by comparing them with the established acceleration or magnetic profile which thus improves the accuracy of the data so that a better accuracy is obtained for the current car position and car velocity. In case of the magnetometer the magnetic flux profile is necessary to obtain the current car position.

If the acceleration profiles are established or stored for different car load conditions, the current acceleration data of the acceleration sensor can even be provided for obtaining the current car load, as the current acceleration varies a little bit according to the actual load status of the elevator car. The same holds true for the current magnetic flux data if it is processed in acceleration data and compared with an established acceleration profile.

Furthermore, with the acceleration profiles or magnetic profiles it is not only possible to verify the car load but also to verify the wear of the elevator components. If, for example the acceleration profiles changes over the time, this could be an indicator for increased friction in the elevator system or for a loss of drive force in the drive system. Accordingly, by monitoring the acceleration profiles or the current acceleration and by comparing them with old acceleration profiles, it is easily possible to obtain wear and maintenance information about the elevator or elevator group. Therefore, preferably, the acceleration profiles are updated in certain intervals. Alternatively, the acceleration profiles may also be updated if current acceleration data deviates increasingly from established acceleration profiles, e.g. at least by a certain threshold value.

Preferably, a memory is provided either in the vicinity of the acceleration sensor and/or magnetometer or in the vicinity of the elevator control in which the magnetic flux profiles and/or acceleration profiles are stored. The processing and evaluating of different profiles or by comparing profiles with current data can be performed in the sensor unit or in the elevator control in a corresponding monitoring module thereof.

Preferably, the acceleration profiles comprises the acceleration values of an elevator ride from each floor to each other floor of the building so that by comparing the current acceleration data with this informative acceleration profile, the current car position and velocity can easily be obtained in every possible trip of the elevator car.

The invention also refers to an elevator or elevator group comprising a system for the generation of call advance data as specified above.

The present invention also refers to a method for the generation of call advance data for an elevator control wherein at least one acceleration sensor and/or magnetometer is/are mounted in connection with the elevator car to generate current acceleration/magnetic flux data from which current velocity data and current car position data is calculated, whereafter from the current car position data and velocity data, call advance data is generated for an elevator control, e.g. a new elevator control which is to replace an old elevator control during modernization of an elevator or elevator group. The call advance data is preferably calculated in a sensor unit mounted in connection with the elevator car or it can also be calculated in an elevator control, particularly in the allocation unit thereof. Via this method, a new elevator control can be easily provided with call advance data without necessitating complex wiring and installation in an existing elevator system. The data of the existing old car position detection system which is normally not in line with nowadays data formats can thereby be neglected so that the old position detection can be removed or left in place unused. The invention therefore provides the elevator builder with an easy option to provide call advance data in connection with a new elevator control. With respect to the inventive method it is referred to the description of the inventive system as explained above.

It shall be well understood that the above-mentioned embodiments can be combined with each other arbitrarily.

It shall further be understood that the acceleration sensor and/or magnetometer, the velocity calculating unit, the position calculating unit can and the call advance processing unit be either located in a kind of connected or integrated way, for example in a sensor unit connected with the elevator car or in connection with an elevator control so that simply the acceleration sensor or magnetometer output signal is transmitted to the elevator control where the velocity calculating unit, the position calculating unit and the call advance processing unit is located. Anyway, preferably, at least the velocity calculating and position calculating unit and preferably also the call advance processing unit are integrated with the sensor, i.e. acceleration sensor or magnetometer, which has the advantage that this integrated sensor unit outputs a call advance data signal which can be easily processed by every modern elevator control.

Figure 2:
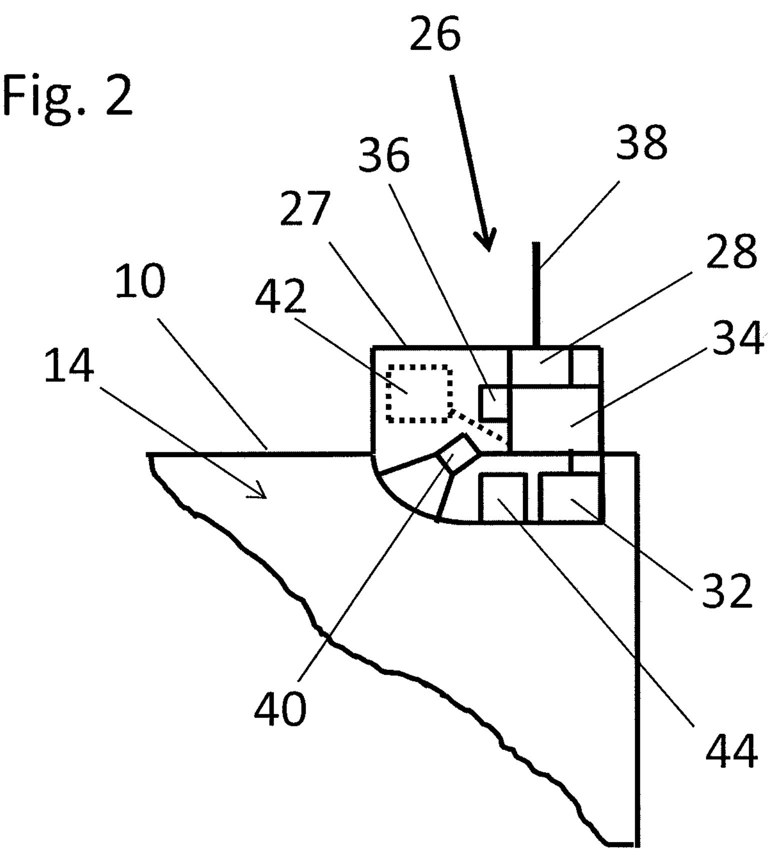

The invention is now described in connection with the enclosed drawings. In these drawings:

FIG. 1 shows a schematic diagram of the use of the inventive call advance data generation system during an overlay modernization of an elevator and FIG. 2 the detail of the sensor unit mounted at the elevator car from FIG. 1.

FIG. 1 shows an elevator system 10 comprising an elevator shaft 12 in which an elevator car 14 moves vertically. The elevator system my still comprise an old position detection system 15, 16 which is connected to an old elevator control 18 and is not used any longer in the invention. The old position detection system 15, 16 comprises a first sensor component 15 installed at the elevator car 14 which co-acts with second sensor component 16 mounted along the shaft length. Electric components of the car 14 are connected to the old elevator control 18 via a car cable 20, e.g. ventilation, lights and a car operation panel display and other usual electric components located in an elevator car, e.g. the first sensor component 15 of the old position detection system. In the upper end of the shaft a new elevator drive unit 22, e.g. a traction sheave drive unit, is provided which drives the elevator car 14 via suspension ropes (not shown). The new drive unit 22 is connected with a new elevator control 24 which is to replace the old elevator control and co-acts therewith for a transition period. The new elevator control 24 is provided in the existing elevator system 10 to establish an overlay modernization wherein a new drive and an improved call allocation system is provided. To enable the new elevator control 24 to obtain call advance data for performing a sophisticated car allocation, a sensor unit 26 is mounted on top of the elevator car which sensor unit 26 has a first communication link 28 which communicates with a second data transmission link 30 mounted at the top of the elevator shaft 12 and being connected with the new elevator control 24. The sensor unit 26 is provided to inform the new elevator control about the current car position and car velocity and call advance which enables an improved call allocation in the elevator system 10. The elevator system may be a single elevator, an elevator group or a multi-group, e.g. in a high rise building.

According to FIG. 2, the sensor unit 26 comprises a housing 27 wherein a magnetometer or acceleration sensor 32, a sensor unit control 34, a first data transmission link 28, a memory 36, (optionally) a camera 40, and optionally a call advance processing unit 42 is located. From the housing 27 an antenna 38 of the first data transmission link 28 protrudes. The call advance processing unit 42 may also at least partly be located in the new elevator control 24.

The magnetometer or acceleration sensor 32 is connected to the sensor unit control 34 which comprises a velocity calculating unit for calculating from the signal of the sensor 32 the current car velocity data as well as a position calculating unit which calculates from the sensor signal or from the current car velocity data current car position data. The sensor unit control 34 is further connected with a memory 36 comprising at least one acceleration profile of the inter-floor travel of the elevator car in the elevator shaft and/or a magnetic profile indicating the magnetic flux at each position of the elevator car in the elevator shaft. The sensor unit control 34 is further connected with the first wireless data transmission link 28 comprising an antenna 38 for outputting the data to the second wireless transmission link 30 located in the elevator shaft 12. Finally, the sensor unit control 34 is connected with a camera 40 which scans the car interior, particularly the entrance region of the elevator car, as to obtain car load data and/or door position data which provides further information for the elevator control about important parameters of the elevator 10.

Optionally, the sensor unit 26 may comprise the call advance processing unit 42 for calculating from the current car velocity data and the current car position data calculated by the velocity and position calculating units in the sensor unit control 34 the call advance data which designates the time until which the car is able to stop at the next approaching floor in travelling direction. This call advance processing unit can also be provided in connection with the new elevator control.

Finally, the sensor unit 26 comprises an accumulator 44 as a power supply for all the components provided in the sensor unit 26. The advantage of an own power supply is that absolutely no wiring is necessary to provide the sensor unit in connection with the elevator car 14. The sensor unit 26 is preferably located in the car roof 15 in the vicinity of a corner of the elevator car. Via this arrangement, the optional camera 40 has the best detection range. It is also possible to locate the sensor unit 26 in the car roof or car wall opposite to the car doors so that the entrance region of the car doors can be monitored by the optional camera. With the shown sensor unit following data can be generated: door status data, car load data, car position data, car velocity data, number of persons in the car, car acceleration data, maintenance data, wear data, car lighting data:

The invention is not delimited to the above embodiments but can be varied within the scope of the appended patent claims.

The invention claimed is:

1. A system for generation of call advance data for an elevator control, wherein said system is configured to be installed in an elevator car moving in an elevator shaft and comprises:
   - at least one acceleration sensor outputting current acceleration data and/or magnetometer outputting a magnetic flux signal which comprises current magnetic flux data at a current position of the elevator car, said at least one acceleration sensor and/or magnetometer is mounted in connection with the elevator car;
   - a velocity calculating unit which calculates from the current acceleration/magnetic flux data or from current car position data current car velocity data;
   - a position calculating unit which calculates from the current acceleration/magnetic flux data and/or from the current car velocity data current car position data;
   - a call advance processing unit which calculates from the current car velocity data and the current car position data call advance data which designates a time until which the car is able to stop at a next approaching floor in travelling direction, which call advance data is transmitted to a call allocation unit of an elevator control;
   - a memory for storing at least one acceleration profile establishing an acceleration vs. time for different routes of the elevator car in the shaft,
   - wherein the acceleration sensor and/or magnetometer, the velocity calculating unit, the position calculating unit, the call advance processing unit and the memory are located in a sensor unit mounted to the elevator car, and the sensor unit further comprises a first wireless data transmission link co-acting with a second wireless transmission link which is connected with the elevator control, such that the call advance data is transmitted to the call allocation unit of the elevator control through the first and second wireless transmission links,
   - wherein the sensor unit further comprises an accumulator for supplying power to all the components in the sensor unit.

2. The system according to claim 1, wherein the first wireless data transmission link is located at an outside of the elevator car.

3. The system according to claim 2, wherein the second wireless transmission link is located in the elevator shaft.

4. The system according to claim 1, wherein the second wireless transmission link is located in the elevator shaft.

5. The system according to claim 1, wherein the call advance processing unit compares the current acceleration data with the at least one acceleration profile to verify or to improve accuracy of the current car position data or car velocity data.

6. The system according to claim 1, according to which different acceleration profiles are stored in the memory for different car load conditions.

7. The system according to claim 6, comprising a car load calculating unit, which derives a current car load by comparing the current acceleration data with the at least one acceleration profile of the corresponding car load condition.

8. The system according to claim 1, wherein the at least one acceleration profiles are updated in certain intervals.

9. The system according to claim 8, wherein the at least one acceleration profile is updated when the current acceleration data deviates from the acceleration profile by at least a certain threshold value.

10. The system according to claim 1, wherein acceleration profiles are repeatedly stored in the memory and a maintenance calculation unit is arranged in the system comprising a comparator to compare the acceleration profiles over time, and wherein a maintenance signal is derived when a difference between corresponding values of a past acceleration profile and a current acceleration profile exceed a certain threshold value.

11. The system according to claim 1, wherein the at least one acceleration profile comprises acceleration values of an elevator ride from each floor to each other floor of a building.

12. An elevator system comprising:

at least one elevator with at least one elevator car driving in at least one elevator shaft driven by a drive unit; and the system for the generation of call advance data for an elevator control according to claim 1.

13. A method for the generation of call advance data for an elevator control of an elevator, wherein at least one acceleration sensor and/or magnetometer is mounted in connection with an elevator car moving in an elevator shaft, said method comprising the steps of:

using the at least one acceleration sensor to generate current acceleration data from which current car velocity data is calculated, whereafter from the current acceleration data and/or from the current car velocity data current car position data is calculated; and/or using the at least one magnetometer to generate current position data from which current car velocity data is generated; and whereafter from the current car velocity data and the current car position data, generating call advance data which designates the time until which the car is able to stop at the next approaching floor in travelling direction, which call advance data is transmitted to a call allocation unit of an elevator control, wherein the acceleration sensor and/or magnetometer, the velocity calculating unit, the position calculating unit, the call advance processing unit and a memory for storing at least one acceleration profile establishing an acceleration vs. time for different routes of the elevator car in the shaft are located in a sensor unit mounted to the elevator car, and the sensor unit further comprises a first wireless data transmission link co-acting with a second wireless transmission link which is connected with the elevator control, such that the call advance data is transmitted to the call allocation unit of the elevator control through the first and second wireless transmission links, and wherein the sensor unit further comprises an accumulator for supplying power to all the components in the sensor unit.

14. The method according to claim 13, wherein the generated call advance data is transmitted to a new elevator control which is mounted in an existing elevator to replace an old elevator control due to overlay modernization.

15. The method according to claim 13, wherein the current acceleration data is compared with the acceleration profile stored in the memory which has been established for inter-floor travel of the elevator car in the elevator shaft to improve values for the current car position data and/or current car velocity data.

16. The method according to claim 13, wherein the current acceleration data is compared with the acceleration profile stored in the memory to derive values for a car load and/or information about wear of the elevator.

* * * * *